United States Patent [19]

Previati

[11] 4,299,552
[45] Nov. 10, 1981

[54] CLAMP FOR FLAT PLATTEN PRESSES
[75] Inventor: Augusto Previati, Milan, Italy
[73] Assignee: Industrie Pirelli, S.p.A., Milan, Italy
[21] Appl. No.: 149,411
[22] Filed: May 13, 1980
[30] Foreign Application Priority Data May 22, 1979 [IT] Italy ............................. 22877 A/79

[51] Int. Cl.³ .......................... B30B 5/06; B29C 3/00
[52] U.S. Cl. ..................................... 425/371; 425/397
[58] Field of Search .............................. 425/371, 397
[56] References Cited
U.S. PATENT DOCUMENTS

| 2,187,253 | 1/1940 | Wallace | 425/397 X |
| 2,187,254 | 1/1940 | Wallace | 425/397 X |
| 3,792,953 | 2/1974 | Ahrweiler | 425/371 |
| 3,907,473 | 9/1975 | DeMets | 425/371 X |
| 3,907,479 | 9/1975 | Platte et al. | 425/371 |
| 3,910,747 | 10/1975 | Dean et al. | 425/397 |
| 3,914,103 | 10/1975 | Dean et al. | 425/397 |
| 3,942,927 | 3/1976 | DeMets | 425/371 X |
| 4,105,387 | 8/1978 | Ahrweiler | 425/371 X |

Primary Examiner—J. Howard Flint, Jr.
Attorney, Agent, or Firm—Stevens, Davis, Miller & Mosher

[57] ABSTRACT

A clamp for feeding an elastomeric strip to a flat platten press without substantial tensile stress has a frame slidably mounted on its supporting members. The clamp has two facing jaws disposed on opposite sides of the path followed by the strip as it is moved to between the jaws. The clamp is moved relative to its support members by a plurality of hydraulic piston and cylinder assemblies disposed with their axes disposed in two planes which are parallel to the plane of the path followed by the strip.

7 Claims, 4 Drawing Figures

CLAMP FOR FLAT PLATTEN PRESSES

The present invention relates to a clamp for flat platten presses and, more particularly, to a clamp for flat platten presses for advancing and/or tensioning uncured ribbon-like elements which are to be cured between the flat plattens of the press.

Clamps for tensioning and/or advancing a ribbon-like element to be cured between the plattens of a flat platten press are already known.

The known clamps have a frame and two clamp jaws fixed to the frame, means for closing the jaws, trucks placed on suitable guides for allowing the movement of the frame, and one or more cylinder-piston assemblies for moving the frame.

These known clamps have several drawbacks, one of which is that moments are exerted on the ribbon-like element either because the clamp frame is advanced unevenly or the clamp frame is deformed by the stresses exerted on it both by the cylinder-piston assemblies and by the resistances of the ribbon-like element to advancing or to tensioning force. In practice, the cylinder-piston assemblies are placed either on one side with respect to the ribbon-like element or laterally to the same. In the first case, the drawing or tensioning force is not aligned with respect to the ribbon-like element and gives rise to a moment in the clamp frame which is discharged on the ribbon-like element.

In the second case, the cylinder-piston assemblies placed laterally to the ribbon-like element give rise to transverse deformations in the clamp frame and in particular in the jaws which tend to advance the lateral portions of the ribbon-like element of a conveyor belt provided with a longitudinal resistant insert member. These moments and these deformations of the frame tend to deform the conveyor belt which may not be completely cross-linked and to displace the resistant insert member from its ideal position inside the conveyor belt with a consequent non-uniformity of the resulting product.

Moreover, in order to prevent transverse bending deformations arising in particular in the clamp jaws, in the known clamps, the entire frame of the clamp is strengthened with a consequent greater weight and an increase in costs.

It is an object of this invention to provide a clamp for tensioning and/or advancing a ribbon-like element placed between the plattens of a flat platten press which draws on the ribbon-like element uniformly without subjecting it to moments or stresses which tend to deform the ribbon-like element. Another object of the invention is to provide such a clamp which is not subjected to transverse deformations when it is under tension and which clamp is light and inexpensive.

Other objects will become apparent from the following explanation with reference to the accompanying drawing, wherein FIG. 1 is a diagrammatic side elevation of a flat platten press provided with one embodiment of a clamp provided by the present invention;

Figure 1:
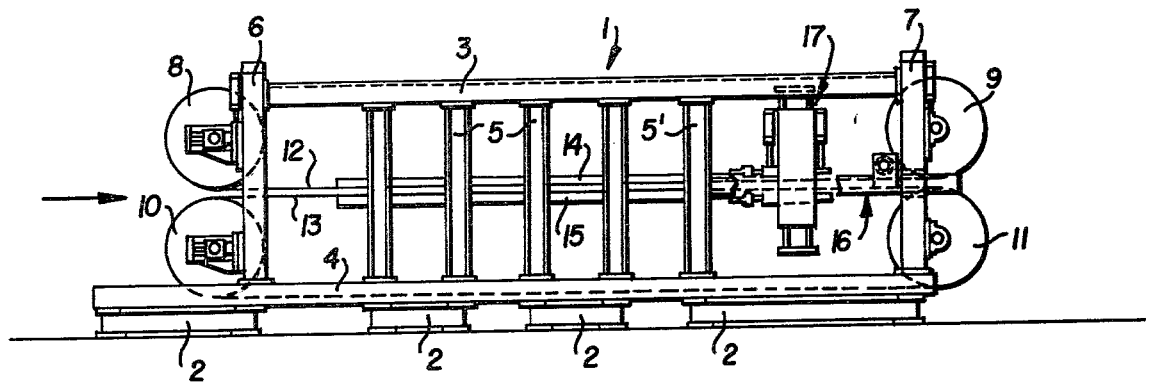

The foregoing objects and others are accomplished in accordance with this invention, generally speaking, by providing a clamp for association with a flat platten press for curing ribbon-like elements having a frame freely sliding with respect to supports integral with the structure of the press, two jaws facing each other and arranged on opposite sides with respect to the plane containing the ribbon-like element, conventional means for pressing the jaws one against the other, characterized by the fact of comprising a plurality of cylinder-piston assemblies arranged with their axes lying on at least two planes parallel to the plane containing the ribbon-like element and on opposite sides of that plane, the cylinder-piston assemblies being disposed to translate the clamp with respect to the supports.

Referring now to the drawing, flat platten press 1 is supported on base 2 and has a frame formed by an upper beam system 3 and a lower beam system 4 connected to each other by means of a set of upright members 5.

At the ends of the upper beam system 3 and of the lower beam system 4 of the frame there are two mountings 6 and 7 to which, two pairs of cylinders 8 and 9, and 10 and 11 are connected in a conventional manner. The axes of cylinders 8, 9, 10 and 11 are all parallel to each other and are connected to mountings 6 and 7 in appropriate seats secured to the bearings.

Two metallic strips, closed like a ring, respectively 12 and 13 extend for the entire length of the press 1 and are wound around the pairs of cylinders 8, 9 and 10, 11.

The two closest metallic strips 12 and 13 pass between an upper flat platten 14 and a lower flat platten 15 of the press 1 and enclose the ribbon-like element to be cured (not shown in the drawing).

Flat plattens 14 and 15 are placed in suitable slots between the spaced upright members 5 of press 1. Said plattens 14 and 15 are provided with heating means such as communicating cavities 49 (see FIG. 2) and inlet and outlet pipes 50 and 51 (see FIG. 1) for circulating steam to said cavities. One of plattens 14 and 15, for example the upper one 14, can be moved away or towards the lower platten by conventional means to press the ribbon-like element to be cured between them. As the press is disposed in FIG. 1, the uncured ribbon-like element enters press 1 through the left end of the press and emerges from press 1 through the right end (see arrow).

Two supports 16 (only one of supports 16 is shown in FIG. 1 with parts broken away) are secured by means of bolts, between the upright member 5' and the mounting 7 nearer the outlet end of the ribbon like element from press 1. Supports 16 are parallel to each other and are arranged in a horizontal plane. Supports 16 support and guide clamp 17.

In the most general form of a clamp for a flat platten press provided by the present invention, clamp 17 comprises a frame freely sliding with respect to supports 16 integral with the structure of the press, two facing jaws arranged on opposite sides of the ribbon-like element to be cured and provided with means for closing them and a plurality of pressure cylinders arranged with their axes lying on at least two planes parallel to the plane containing the ribbon-like element, which will be defined later on. The cylinders are placed on opposite sides of the plane in which the ribbon-like element is disposed. The cylinder-piston assemblies are placed in such a way as to translate the clamp with respect to the supports.

Preferably, each of the cylinder-piston assemblies has one end integral with the frame and the other end integral with the front edge of the flat plattens of the press nearer the frame.

The two strips closed as a ring 12 and 13, can constitute an integrating part of the clamp 17 or can be associated to the flat platten press 1 as previously indicated.

Figure 2:
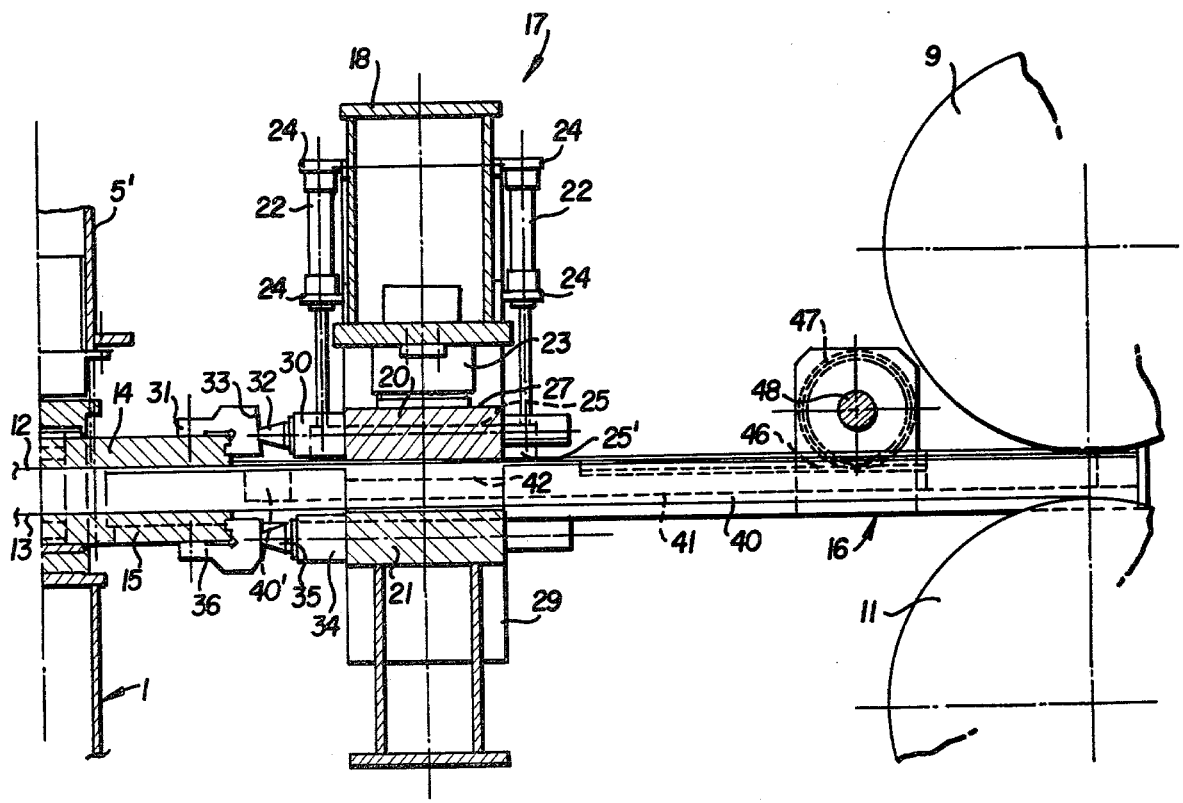
FIG. 2 is a diagrammatic side elevation, partially in section, showing the clamp portion in an enlarged elevation disposed in the assembly shown at the right of FIG. 1.
Figure 3:
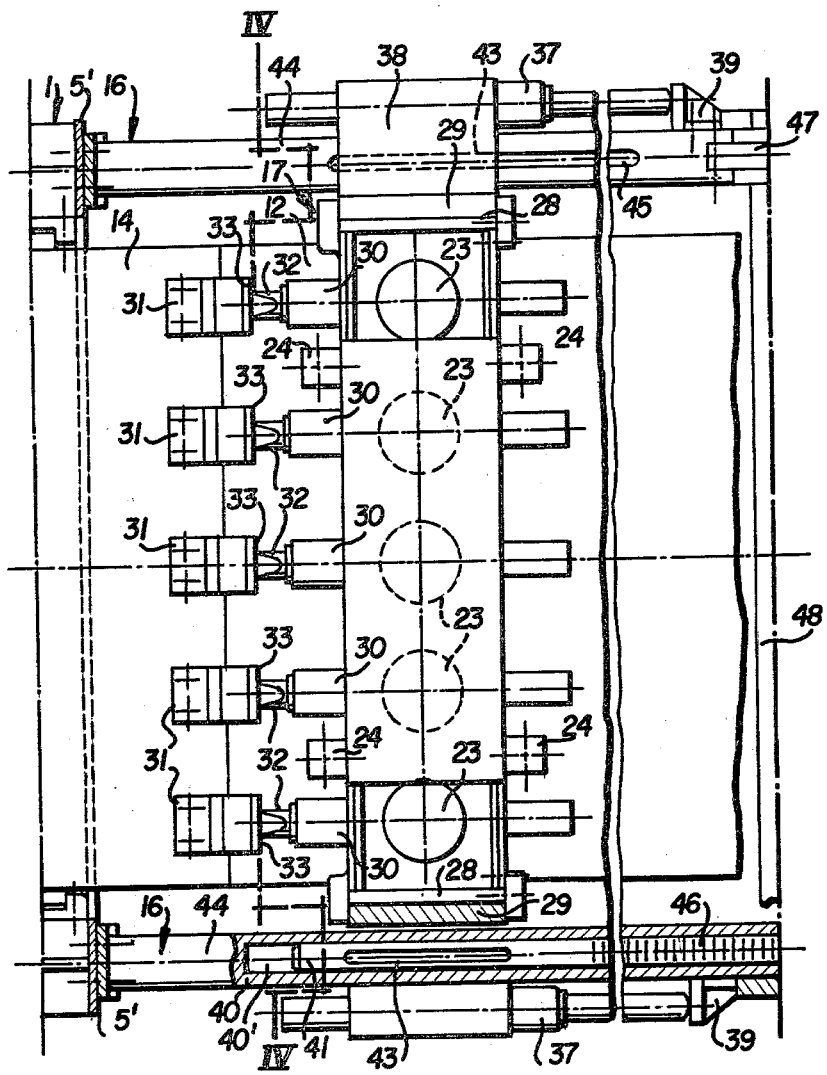
FIG. 3 is a top plan view of the clamp of FIGS. 1 and 2.
Figure 4:
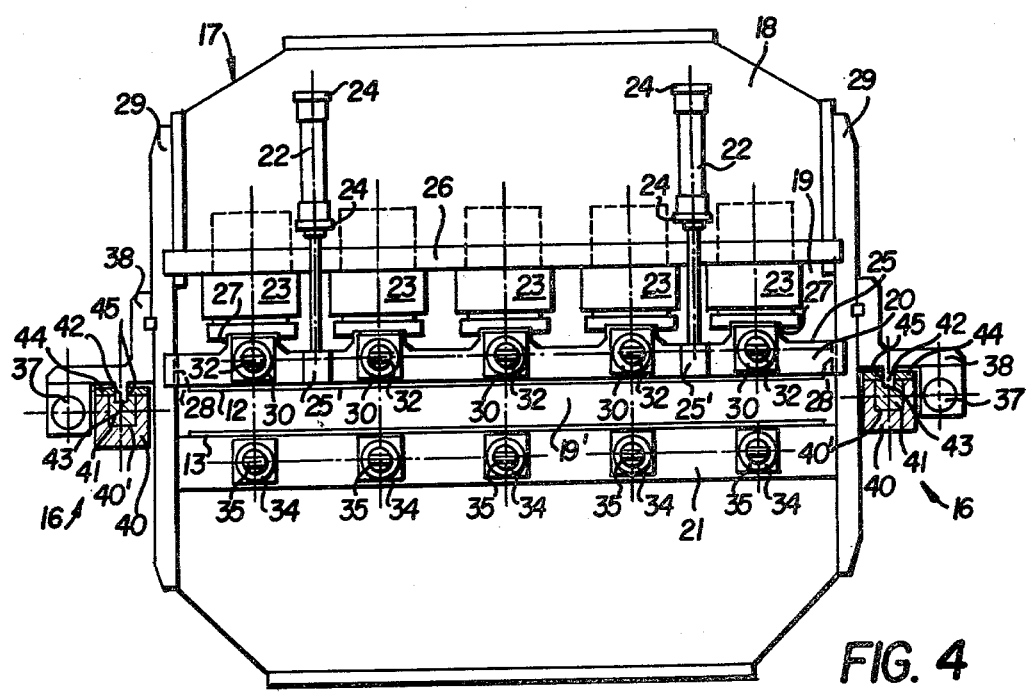
FIG. 4 is a front elevation, partially in section, taken along the line IV—IV of FIG. 3, the side of the clamp of the invention facing the flat platten press.

The clamp 17, in a particular embodiment according to the present invention is shown in detail in FIGS. 2, 3 and 4. Clamp 17 comprises a box-shaped frame 18 formed by sheets welded to one another.

Frame 18 is provided with a transverse opening 19 of a substantially rectangular shape (see FIG. 4) which is divided into two parts by an upper jaw 20. Jaw 20 slides with respect to the lower jaw 21, while the jaw 21 constitutes the lower edge of the opening.

The surfaces in contact with the metallic strips of jaws 20 and 21 can be provided with conventional means for increasing the mutual friction coefficient.

Between the two facing surfaces of jaws 20 and 21 there are, in contact with the surfaces, the metallic strips 12 and 13. The space 19' between metallic strips 12 and 13 is instead taken up by the ribbon-like element (not shown). The movement of the upper jaw 20 with respect to the lower one 21 is obtained by conventional means, which in the embodiment shown in FIGS. 2, 3 and 4 are two distinct groups of cylinder-piston assemblies. A first group, constituted by four double-acting cylinder-piston assemblies, is utilized for both rapidly approaching and retracting jaw 20 from jaw 21.

The second group is constituted by five cylinder-piston assemblies 23 and is used for pressing the jaw 20 against the jaw 21. As shown in the drawing, the cylinder-piston assemblies 22 are of smaller dimensions than cylinder-piston assemblies 23 since the former only need to exert a lower force apt only to displace upwards or downwards the jaw 20, while the latter are of greater dimensions and must exert a greater force to be able to clamp between the two jaws the ribbon-like element and the two metallic strips 12 and 13. This differentiation existing between the two groups of hydraulic cylinder-piston assemblies 22 and 23 permits the use of a single pump, of modest capacity, for moving both groups, with the rate of flow of fluid sent to the two groups being reduced in both cases. The four cylinders of the first group of cylinder-piston assemblies 22 are connected in a conventional way to the upper part of the frame 18 of the clamp 17 by means of small brackets 24, two for each cylinder, one small bracket at the upper end of the cylinder and the other small bracket at the lower end; the small brackets being welded or bolted in such a way as to project from the frame.

Cylinder-piston assemblies 22 of the first group are symmetric with respect to the longitudinal axis of the press 1, two on each front face of the clamp 17.

The stems or piston rods of the pistons of the cylinder-piston assemblies 22 are connected to the upper face 25 of the jaw 20 by four small brackets 25' which are a prolongation of upper face 25.

The second group of cylinder-piston assemblies 23 is placed inside the frame 18 and preferably along the transverse axis of symmetry of frame 18. The cylinders are secured in a conventional way to the upper part of frame 18, for example to a cross member 26 (FIG. 4), while the stems of the pistons are connected, or also for example only laid, with the interposition of a ball joint not shown in the drawing, on the upper surfaces of the projections 27 (FIGS. 2 and 4) placed on the upper face 25 of upper jaw 20.

In order to provide a guide for the vertical movements of jaw 20, jaw 20 is provided on each lateral edge with a notch 28 where an upright member 29, a part of the frame 18 and constituting, moreover, the connection between the upper part and the lower part of the frame, is encased.

A plurality of cylinder-piston assemblies for advancing the clamp 17 are, moreover, present both inside the jaw 20 and inside the jaw 21. In particular, five cylinder-piston assemblies 30, hydraulically moved, are associated to the upper jaw 20.

The axes of the cylinder-piston assemblies 30 are all arranged, preferably, in a single plane parallel to the plane containing the ribbon-like element. In the present invention, the plane containing the ribbon-like element is understood to be the plane lying at one-half of the thickness of the ribbon-like element which is to be cured and, preferably, it is understood to be the plane containing the resistant insert member of the ribbon-like element which is to be cured. Since generally the ribbon-like elements have a constant thickness, the plane of the ribbon-like element, as previously defined, is parallel to the planes of the surfaces of the ribbon-like element. The cylinders of the cylinder-piston assemblies 30 are integral wih the cavities partially present within projections 27 and partially within the upper jaw 20. The stems of the pistons of assemblies 30 are provided with a flat head punch 32 at their end in contact with protuberances 31 placed on the front end nearer the clamp 17 of the upper flat platten 14 and are fixed to the flat platten 14.

Since the upper jaw 20 must move vertically with respect to the upper flat platten 14, when the clamp 17 is opened or closed, the contact among the flat head punches 32 and the front surface 33 of protuberances 31 takes place on the front surface 33 prepared with known technics. In particular, front surface 33 is slightly inclined downwards in the direction of the clamp 17 and more particularly the angle of inclination is equal to the angle of friction of the materials in contact with one another.

Other five cylinder-piston assemblies 34, hydraulically moved, are arranged inside the lower jaw 21 and are used for advancing clamp 17 too. Cylinder-piston assemblies 34 have their own axes disposed in a single plane parallel to the plane of the ribbon-like element to be cured, as previously defined. Moreover, the axes of cylinder-piston assemblies 34 are preferably contained in five planes perpendicular to the plane containing the ribbon-like element and parallel to the advancing direction of the ribbon-like element with respect to the press, each of the planes containing moreover the axis of a cylinder-piston assembly 30 (see FIG. 4). The axis of a cylinder-piston assembly 23 is disposed in each of the five planes so that the prolongation of the axis of each cylinder-piston assembly 23 intersects perpendicularly the axes of the cylinder-piston assemblies 30 and 34 in a single plane (see FIGS. 3 and 4).

The cylinders of cylinder-piston assemblies 34 are disposed in appropriate cavities present within the lower jaw 21, while the stems of the pistons of cylinder-piston assemblies 34 are provided with flat head punches 35 like those present on the stems of the pistons of the cylinder-piston assemblies 30. Flat head punches 35 are only laid on the protuberances 36 secured to the lower flat platten 15 nearer the clamp 17. Since there are no relative vertical movements between lower flat platten 15 and lower jaw 21, punches 35 may also be secured to protuberances 36.

Preferably, both the cylinder-piston assemblies 30 and the cylinder-piston assemblies 34 are single-acting cylinder-piston assemblies and are used only for drawing away the clamp 17 from the flat plattens of the press.

In order that the clamp 17 return near the plattens, two additional cylinder-piston assemblies 37 are utilized (FIGS. 3 and 4). Cylinder-piston assemblies 37, hydraulically moved, are preferably single-acting cylinder-piston assemblies since they effect only the return stroke of clamp 17 towards the plattens of the press. The cylinders of cylinder-piston assemblies 37 are secured to a L-shaped profile member 38 (FIG. 4), one side of the L-shaped profile member being fixed to the outer face of the upright member 29 (FIGS. 3 and 4), while the other side extends, outwardly from upright member 29 in an opposite direction with respect to clamp 17. The end of the piston stem of each cylinder-piston assembly 37 lies against a seat 39 (FIG. 3) secured in such a way as to project from the outer lateral surface of the support members 16. Supports 16 have besides the function of supporting the weight of the clamp 17 also the function of guiding clamp 17 as it advances movement and to keep it always perpendicular to the advancing direction of the ribbon-like element. In order to accomplish also this task, support members 16 (FIG. 3) are provided with a particular structure comprising a beam 40 provided with a longitudinal groove 40' where a guide shoe 41 freely slides, guide shoe 41 being disposed against a layer of lubricant material for example, oil contained in the groove 40'. Guide shoe 41 is connected with the clamp 17 by means of a fixed joint formed by an element 41 (FIG. 4) projecting from the lower surface of the L-shaped profile section 38 engaged in a cavity 43 (FIGS. 3 and 4) present on the upper surface of guide shoe 41.

The upper part of support member 16 (see FIG. 4) is constituted by a sheet 44 provided with an elongated opening 45 to permit the movement of element 42 engaged in cavity 43 present in the guide shoe 41 when guide shoe 41 slides with respect to the beam 40 of the bearing 16. The guide shoe 41 slides with respect to the beam 40 of the bearing 16. The guide shoes 41 are provided with a rack toothing 46 (schematically indicated in FIGS. 2 and 3) at their end portions opposite to the ends where there is the fixed joint between the element 42 and the cavity 43 of guide shoes 41.

Each of rack toothings 46 engages with a toothed wheel 47 fixed to the supports 16 (FIGS. 1 and 2). The two toothed wheels 47 are connected integral with each other being mounted on a single axis 48 (FIG. 3).

This guarantees the contemporaneous displacement of the two guide shoes 41 and consequently the holding the the clamp in a position substantially perpendicular to the advancing direction of the ribbon-like element.

The devices coordinating the movements of the various mechanisms of the clamp, i.e. the devices coordinating the movements of the various cylinder-piston assemblies for closing/opening and pressing the jaws of the clamp and for advancing and returning the frame of the clamp with respect to the flat plattens of the press, have not been indicated in the previous description of the clamp of the present invention and on the drawings.

These devices for coordinating the movements of the various mechanisms of the clamp are either conventional electric circuits, or pneumatic means, or mechanical means and the like and a technician of the field knowing the operation of the clamp of the present invention described herebelow is able to realize them.

The operation of the clamp of the present invention for advancing a ribbon-like element which is cured by a flat platten press is the following.

By way of example, as a ribbon-like element to be cured has been considered a conveyor belt constituted by a longitudinal resistant insert member embedded in a layer of elastomeric material to which one or more layers of elastomeric compounds are doubled on each side. In order to make the description of the operation easy, it can be supposed that the length of the conveyor belt between the flat plattens of the press is already cured and that therefore the clamp must now remove the conveyor belt, already cured, from the press and at the same time pull a new portion of conveyor belt, not cured, into the press.

The jaws 20 and 21 of the clamp are at this moment already clamped, pressed the one against the other by the pressure of the fluid present within the cylinder-piston assemblies 23 and press between them the pack constituted by the two metallic strips 12 and 13 and by the ribbon-like element.

Always keeping the fluid under pressure, the injection of the fluid under pressure into the cylinder-piston assemblies 30 and 34 placed, respectively, inside the upper jaw 20 and the lower jaw 21 is begun. Preferably, the pump for sending the fluid under pressure into cylinder-piston assemblies 30 and 34 is single so as to have the same pressure exercised in all the cylinders against the faces of the respective pistons.

The pressure of the fluid starts to expel the piston stems from the various cylinders, which contacting the protuberances 31 and 36 secured respectively to the upper flat platten 14 and lower one 15 produce the movement of the clamp 17 away from the plattens.

The clamp 17, in its moving motion, pulls also along with it the conveyor belt already cured and the two metallic strips 12 and 13 in contact with it, since the pressure exerted between the two jaws 20 and 21 clamping between them both the conveyor belt and the two metallic strips is such as to give rise to a friction coefficient which prevents any slipping between the two jaws and the pulled elements.

The clamp 17 while moving away from plattens 14 and 15 is borne and guided by supports 16 fixed to the structure of the press. In particular the two guide shoes 41 positioned in the grooves 40' within beams 40 slide with respect to the beams and move themselves together with the frame 18 of the clamp 17 away from the flat plattens 14 and 15.

The end portions of guide shoes 41 are provided with a rack toothing 46 engaging with the toothed wheels 47, fixed to each other by the common axis of rotation 48, make uniform in this way the motion of the frame 18 of the clamp 17 when this latter moves itself away from the plattens 14 and 15 even if for any reason, for example owing to the loss of pressure in the conduits, the pressure of the fluid is not the same in each of the cylinder-piston assemblies 30 and 34. When the clamp 17 has removed the portion of conveyor belt already cured from the flat plattens 14 and 15 of the press, making a corresponding portion still uncured of the conveyor belt enter between the flat plattens, the injection of fluid under pressure into the cylinder-piston assemblies 30 and 34 stops.

At this point the clamp is opened and fluid under pressure is introduced into the four cylinder-piston assemblies 22 which lift the upper jaw 20 with respect to the lower jaw 21.

At the same time, the inside of the cylinder of the five cylinder-piston assemblies 23 are placed into communication with the fluid tank so that the same lifting motion of the upper jaw 20 expels from the cylinder the fluid contained therein. During the lifting motion there is also the sliding movement of the ends of the flat head punches 32 against the front surface 33 of the protuberances 31 secured to the upper flat platten 14, sliding which is made easy by the inclination given to surfaces 33. Immediately after the starting of the lifting action of the upper jaw 20, the return movement of the clamp 17 towards the flat plattens 14 and 15 takes place.

This return begins by putting into communication the inside of the cylinders of the cylinder-piston assemblies 30 and 34 with the fluid tank, while fluid under pressure is injected into the two cylinder-piston assemblies 37 which transmit the returning motion to the clamp 17 also favoring the emptying of the cylinders of the cylinder-piston assemblies 30 and 34.

During the return of the clamp 17 towards the flat plattens 14 and 15 the motion of the clamp is still guided by the guide shoes 41 sliding within the grooves 40' of the beams 40 while the end portions of guide shoes 41 provided with a rack toothing 46 engaging with the toothed wheels 47; integral to each other, guarantee good alignment of the frame 18 of the clamp 17 with respect to supports 16.

At the end of the return motion of the clamp 17, when the clamp is returned to the position which it had at the beginning of the cycle, i.e. near the flat plattens 14 and 15 of the press, the step of closing the clamp 17 can be started.

Therefore, fluid under pressure is sent into the four cylinder-piston assemblies 22 so that the upper jaw 20 approaches the lower jaw 21 with the consequent sliding of the end of the flat head punches 32 against the front surfaces 33 of the protuberances 31 secured to the upper flat platten 14.

The descent of the jaw 20 causes a depression inside the cylinders of the cylinder-piston assemblies 23 withdrawing, therefore, fluid from the tank.

The injection of the fluid under pressure to the four cylinders of the cylinder-piston assemblies 22 stops with the contact of the upper jaw 20 with the upper metallic strip 12.

At this point the cylinders of the cylinder-piston assemblies 22 are put into communication with the tank, while the same pump, which has pumped fluid under pressure to cylinder-piston assemblies 22, pumps now the fluid under pressure to the cylinders of the cylinder-piston assemblies 23 until the two jaws 20 and 21 press between them the pack constituted by the upper metallic strip 12, conveyor belt already cured and lower metallic strip 13 with a force necessary for giving rise to such a friction as to suitably tension them when the cylinder-piston assemblies 30 and 34 are next put under pressure. When a further portion of the conveyor belt is cured and removed from the press, the clamp will repeat the operations just described to remove also the portion from the press and contemporaneously to pull a new portion of conveyor belt to be cured into the press.

By means of the clamp provided by the present invention, it can be easily understood how the proposed purposes are achieved. In fact the structure of the clamp of the present invention is a light structure and consequently not expensive. Notwithstanding this, the clamp of the invention has a structure which is not deformed and in particular which does not bend transversally when the clamp subjects the ribbon-like element and the two metallic strips pressed between the two jaws to advancing or tensioning movement. This is due to the plurality of cylinder-piston assemblies 30 and 34 arranged parallel to one another along the transverse dimension of the clamp, the cylinder-piston assemblies 30 and 34 exerting a thrust distributed over more than one point, both of the upper jaw and of the lower jaw.

Moreover, the cylinder-piston assemblies 30 and 34 act in two planes arranged on opposite sides with respect to the plane containing the ribbon-like element, as previously defined, exerting a balanced drawing action on the ribbon-like element whose resultant force lies on the plane of the ribbon-like element.

This drawing action gives rise on the ribbon-like element only to tensioning stresses, which are very well supported by the longitudinal resistant insert member embedded in the ribbon-like element, and do not give rise to any torsional or cutting stress on the ribbon-like element since the drawing forces are exerted with equal arm with respect to the ribbon-like element, but on opposite sides and with the same direction, so that the resulting moment with respect to the ribbon-like element is nill, and so are also the cutting forces. Moreover, the force of compression exerted by the jaws of the clamp on the ribbon-like element is distributed on the ribbon-like element thanks to the presence between the ribbon-like element and the two jaws of the two metallic strips associated with the clamp.

The arrangement of the clamp of the present invention upstream of the cylinders 9 and 11 around which the metallic strips 12 and 13 are wound is essential only as regards the quality of the finished product and not as regards the working of the clamp or of the press, for the just explained reason, but also for the following further reason.

As the clamp pulls the whole pack of the metallic strip, the ribbon-like element and the second metallic strip, practically all of the pulling action exerted by the clamp is undergone by the metallic strips and eventually by the longitudinal resistant insert member of the ribbon-like element if the insert member is present. It follows that the elastomeric material of the ribbon-like element, which is still at a high temperature and not yet completely cross-linked or may be uncured, is practically not subjected to tensile stresses with consequent beneficial effects on the finished product since the whole pack is pulled at the same time without relative movements between the metallic strips and the ribbon-like element. In particular, if the clamp of the present invention is associated with a flat platten press as described in U.S. Pat. No. 4,115,510, working according to the process described in this application, and in particular a flat platten press provided with the improvements described in U.S. Pat. No. 4,164,440, the disclosure of the patent and application being incorporated herein by reference, the advancing of the pack of two metallic strips and a ribbon-like element is furthermore made easier by the means which reduces the friction between the metallic strips and the flat plattens of the press with improved effects on the finished product as regards in particular the precise arragement of the longitudinal resistant insert member embedded in the ribbon-like element.

The intersection in a single vertical plane of the axis of a cylinder-piston assembly 23 both with the axis of a cylinder-piston assembly 30 and with the axis of a cylinder-piston assembly 34 creates a concentration of stresses, in particular in the upper jaw, but the concentration of stresses is centered where already there are the strengthening structures constituted by the cylinders of the cylinder-piston assemblies 30 and 34 and consequently it is possible to lighten the structure of the upper jaw in correspondence of the zones where the cylinder-piston assemblies 23 and 30 do not act, in particular between the adjacent projections 27.

Since the supports of the clamp of the present invention are placed laterally with respect to the ribbon-like element, the stresses exerted on the clamp both by the reactions of the supports and by the cylinders of the cylinder-piston assemblies 30 and 34 act on three planes practically equidistant from one another. In effect, the distance between the plane of the supports and the plane where the axes of the cylinder-piston assemblies 34 lie, is fixed and constant, while only the distance between the plane of the supports and the plane where the axes of the cylinder-piston assemblies 30 lie, can change (see FIG. 4), only a small amount. This variation is due to the differences of the thicknesses of the ribbon-like elements which can be cured with the flat platten press to which the clamp is connected. This nearly constant distance between these three planes makes the clamp of the present invention practically balanced also with respect to the structure of the press and consequently moments which tend to rotate the clamp in a vertical plane parallel to the advancing direction of the clamp with respect to the press, or are nill or are of very small entity, the whole in favor of the supports of the clamp which can be lightened and are little stressed.

Moreover, because of the guide shoes integral with the clamp and provided with a rack toothing engaging with the toothed wheels integral to each other and connected to the supports, the possibility that moments due for example to different thrusts exerted by the cylinder-piston assemblies 30 and 34 are avoided or also to greater resistances opposed to the translation movement by some portions of the metallic strips in contact with the plattens of the press. Furthermore, the eventual stresses which can result from a non-perfect parallelism between the faces of the belt to be cured are also overcome.

As a matter of fact, the rack toothings engaging with the toothed wheels integral to each other require the clamp to advance with a motion always parallel to itself preventing the formation of any moment tending to rotate the clamp in an horizontal plane or to make the clamp advance in a non-uniform way.

Although particular embodiments of a clamp for a flat platten press for advancing and/or tensioning a ribbon-like element to be cured between the flat plattens have been illustrated and described, it is understood that the invention includes in its scope any other alternative embodiment accessible to a technician of this field.

I claim:

1. A clamp for tensioning or advancing intermittently a ribbon-like element cured within a press, said clamp comprising a frame, movable with respect to a support fixed with respect to the press and lying in the plane of the ribbon-like element, said frame comprising two parallel jaws, placed each on opposite sides with respect to said ribbon-like element and means on the press for pressing said jaws together to grip between them said ribbon-like element, said frame further comprising two sets of single-acting cylinder-piston assemblies housed one in each jaw, for tensioning or advancing said ribbon-like element in the direction of extraction of the cured ribbon-like element from the press, each set of cylinder-piston assemblies being disposed in a single plane symmetrically with respect to the ribbon-like element and two further single-action cylinder-piston assemblies being provided to return the frame near the press.

2. Clamp according to claim 1 wherein said support comprises two beams arranged parallel to the direction to clamp motion, one on each side of said ribbon-like element, each provided with a groove, and two toothed wheels mounted on the same axis and integral with each other and in fixed position with respect to the structure of the press, said frame comprising two guide shoes projecting therefrom and inserted one in each groove, each guide shoe being provided with a rack toothing at its farthest end with respect to the frame, each rack toothing engaging with one of said toothed wheels.

3. Clamp according to claim 1 or 2 wherein said means for pressing together said clamp jaws comprise two sets of cylinder-piston assemblies having vertical axis and different diameters associated to the upper clamp jaw, the set of cylinder-piston assemblies of smaller diameter being symmetrically positioned with respect to the advancing direction of the ribbon-like element, while the set of larger diameter cylinder-piston assemblies is placed along the transverse axis of symmetry of the frame perpendicular to the advancing direction of the ribbon-like element.

4. Clamp according to claim 1, 2 or 3 wherein each of said larger diameter cylinder-piston assemblies has its own axis lying on a vertical plane, parallel to the advancing direction of said ribbon-like element, coincident with the axis of at least two cylinder-piston assemblies housed one in each of said clamp jaws.

5. Clamp according to claim 1 or 2 comprising two endless strips extending the entire length of the press, said strips being each in contact with a jaw of the clamp when the clamp is closed to press between said strips a ribbon-like element.

6. In combination,
 a press having facing heated plattens for step-wise compressing and curing an elongated strip of heat curable elastomer, means associated with each of said plattens for heating each platten to the curing temperature of said elastomeric strip, a pair of vertically spaced metallic strips disposed to be between said plattens and on opposite sides of said elastomeric strip to compress the elastomeric strip therebetween when the said plattens are closed, and means associated with the press for moving the plattens together to compress the elastomeric strip between the metallic strips while the elastomeric strip is substantially motionless, and
 a clamp means for intermittently moving the elastomeric strip to between the plattens and for supporting the strip substantially motionless between the plattens, said clamp means having a frame slidably supported on the press, said frame of the clamp comprising a pair of associated facing jaws for grasping said strip, means supported on said frame of the clamp for moving one of said jaws with respect to the other into and from grasping position comprising a single action pressure piston-cylinder assembly in each jaw, and means carried by the clamp on opposite sides of the elastomeric strip as the elastomeric strip is disposed between the plattens for moving said clamp laterally with respect to said plattens.

7. The combination of press and clamp of claim 6 wherein said press further comprises a pair of rollers disposed on each side of said plattens and associated with each other with a nip therebetween adapted to receive the assembly of metallic and elastomeric strips.

* * * * *